(12) United States Patent
Liu et al.

(10) Patent No.: US 7,728,529 B2
(45) Date of Patent: Jun. 1, 2010

(54) LED DRIVER USING A DEPLETION MODE TRANSISTOR TO SERVE AS A CURRENT SOURCE

(75) Inventors: Jing-Meng Liu, Hsinchu (TW);
Chung-Lung Pai, Taipei (TW);
Hung-Der Su, Luju Township, Kaohsiung County (TW)

(73) Assignee: Richtek Technology Corporation, R.O.C., HsinChu (TW)

( * ) Notice: Subject to any disclaimer, the term of this patent is extended or adjusted under 35 U.S.C. 154(b) by 647 days.

(21) Appl. No.: 11/149,292

(22) Filed: Jun. 10, 2005

(65) Prior Publication Data
US 2005/0275711 A1    Dec. 15, 2005

(30) Foreign Application Priority Data
Jun. 14, 2004  (TW) .............................. 093117082 A

(51) Int. Cl.
*H05B 37/02* (2006.01)

(52) U.S. Cl. ..................... 315/291; 315/210; 315/307

(58) Field of Classification Search ............. 315/209 R, 315/224–226, 291, 307, 185 R, 186, 210, 315/211, 241 S, 312–315, 320, 362; 362/800; 345/76, 77, 82
See application file for complete search history.

(56) References Cited

U.S. PATENT DOCUMENTS

| | | | | |
|---|---|---|---|---|
| 4,403,157 | A * | 9/1983 | Guajardo et al. ............. | 327/520 |
| 5,087,982 | A * | 2/1992 | Smothers ..................... | 398/118 |
| 5,933,441 | A * | 8/1999 | Chen ......................... | 372/38.09 |
| 6,348,766 | B1 * | 2/2002 | Ohishi et al. ............. | 315/200 A |
| 6,498,440 | B2 * | 12/2002 | Stam et al. .................. | 315/291 |
| 6,762,563 | B2 * | 7/2004 | St-Germain et al. ......... | 315/129 |
| 7,202,608 | B2 * | 4/2007 | Robinson et al. ............ | 315/224 |

* cited by examiner

*Primary Examiner*—Douglas W Owens
*Assistant Examiner*—Jimmy T Vu
(74) *Attorney, Agent, or Firm*—Tung & Associates

(57) ABSTRACT

In a LED driver using a depletion mode transistor to serve as a current source, the depletion mode transistor is self-biased for providing a driving current to drive at least one LED, thereby requesting no additional control circuit to control the depletion mode transistor. The driving current is independent on the supply voltage coupled to the at least one LED, thereby requesting no additional voltage regulator, reducing the circuit size, and lowering the cost.

10 Claims, 5 Drawing Sheets

LED DRIVER USING A DEPLETION MODE TRANSISTOR TO SERVE AS A CURRENT SOURCE

FIELD OF THE INVENTION

The present invention is related generally to a driver for driving Light-Emitting Diode (LED) and more particularly, to a LED driver using a depletion mode transistor to serve as a current source.

BACKGROUND OF THE INVENTION

LEDs are so easy and cost-effective to use that they are widely applied in various portable apparatus. However, when several LEDs are used for providing a light source, a control circuit is requested for all the LEDs to have uniform brightness. The brightness of a LED is proportional to the driving current flowing through the LED, and therefore the control of the driving current for a LED is the control of the brightness of the LED. Generally, cost is an important concern when providing a current source for driving a LED.

FIG. 1 shows a conventional LED driver 100 comprising several light sources, LEDs 104 and 106, LEDs 108 and 110, LEDs 112 and 114, LEDs 116 and 118, and LEDs 120 and 122, coupled together in parallel, and each light source thereof is coupled in series with a resistor 102. When coupled with a supply voltage VCC, based on the Ohm's law, the LED driver 100 will have the light sources each flowing with a driving current $$I_n = \frac{Vcc - Vd_n}{R} \quad [\text{EQ-1}]$$

where n=1, 2, 3, 4, or 5, $Vd_n$ is the forward-bias voltage across the respective light source, and R is the resistance of the resistor 12. From the equation EQ-1, the currents $I_1$-$I_5$ supplied for the LEDs 104-122 are dependent on the respective forward-bias voltages $Vd_n$. The forward-bias voltages $Vd_n$ varies with the size of the LED, the process to manufacture the LED, and the temperature of the LED in the respective light source, it is therefore hard for the currents $I_1$-$I_5$ to be uniform.

In U.S. Pat. No. 5,025,204 to Su, a current mirror using resistor ratios in CMOS process is provided by using an additional control circuit (i.e., operational amplifiers) to unify the driving currents flowing through several light sources. However, the driving current flowing through a light source is dependent on the battery voltage supplied to the light source, and the additional control circuit will increase the cost. Proposed by U.S. Pat. No. 6,538,394 to Volk et al., current source methods and apparatus for light emitting diodes further employ an adjustable power supply for providing a stable supply voltage to generate driving currents for each of several light sources, in addition to a control circuit to maintain the driving currents of the light sources uniform. This circuit also requires more cost.

Therefore, it is desired a low-cost LED driver.

SUMMARY OF THE INVENTION

One object of the present invention is to provide a LED driver using a depletion mode transistor to serve as a current source.

Another object of the present invention is to provide a low-cost LED driver.

Yet another object of the present invention is to provide a high efficiency LED driver.

According to the present invention, a LED driver comprises a depletion mode transistor that is self-biased for providing a driving current to drive at least one LED. For the driving current is generated by the self-biased depletion mode transistor, the driving current is independent on the supply voltage coupled to the at least one LED, and therefore additional voltage regulator and control circuit are not necessary, thereby reducing the cost. The depletion mode transistor may be a Metal-Oxide-Semiconductor Field-Effect Transistor (MOSFET) or a Junction Field-Effect Transistor (JFET). If the depletion mode transistor is a JFET, the cost may be further reduced by integrating the JFET with the LEDs on a same chip, since a JFET process could be combined in a LED process. Moreover, the LED driver will have a higher efficiency due to the smaller conductive resistance of the JFET. In another embodiment, a switch is further comprised in the LED driver to switch the driving current, and the switch is switched by a controller using (Pulse-Width Modulation) PWM or Pulse-Frequency Modulation (PFM) for modulating the average of the driving current, and thereby modulating the brightness of the LEDs. The switch may be also integrated with the current source and LEDs on a same chip.

BRIEF DESCRIPTION OF DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 2:
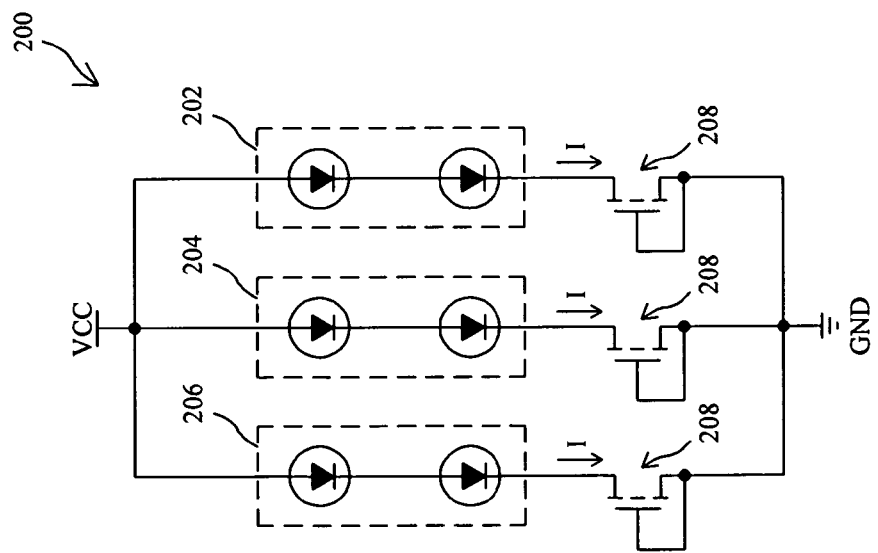
FIG. 2 shows a first embodiment of a LED driver according to the present invention.

FIG. 2 shows a LED driver 200 according to the present invention, which comprises three light sources 202, 204, and 206 coupled together in parallel between a supply voltage VCC and ground GND. Each of the light sources 202-206 includes two LEDs, and is coupled in series with a depletion mode NMOS transistor 208 that behaves as a current source. Each of the depletion mode NMOS transistors 208 has its own gate and source coupled together to ground GND, and its drain coupled to a respective one of the light sources 202-206, such that a driving current I for the LEDs in the respective one of the light sources 202-206 is generated due to the self-bias of the depletion mode NMOS transistor 208. It is well known for a MOS transistor that $$I \propto (V_{GS} - V_t)^2 \quad [\text{EQ-2}]$$

where $V_{GS}$ is the voltage difference between the gate and source of the depletion mode NMOS transistor 208, and $V_t$ is the threshold voltage for the depletion mode NMOS transistor 208 to be conductive. Since the gate and source of the depletion mode NMOS transistor 208 are coupled together, the voltage difference therebetween is zero, i.e., $V_{GS}=0$, and therefore the equation EQ-2 becomes $$I \propto V_t^2 \quad [\text{EQ-3}]$$

The threshold voltage $V_t$ is dependent on the semiconductor process of manufacturing the depletion mode NMOS transistor 208, and therefore all the driving currents I's for the light sources 202-206 in the LED driver 200 will be the same only that all the depletion mode NMOS transistors 208 are manufactured by a same process. Due to the same magnitude of the driving currents I's, the light sources 202-206 will have a uniform brightness. If the depletion mode NMOS transistor 208 is designed to have a threshold voltage $V_t$ smaller than −0.5V, i.e., its absolute value $|V_t|>0.5$, the device size of the depletion mode NMOS transistor 208 and the variation of the driving current I will be reduced. In other embodiment, the depletion mode NMOS transistor 208 may be replaced with a JFET. A JFET process could be combined in a LED process, and therefore the JFETs for serving as the current sources may be integrated with the LEDs in the light sources 202-206 on a same chip to further reduce the cost. Moreover, a JFET has a smaller conductive resistance, it may improve the efficiency of the LED driver 200.

Figure 1:
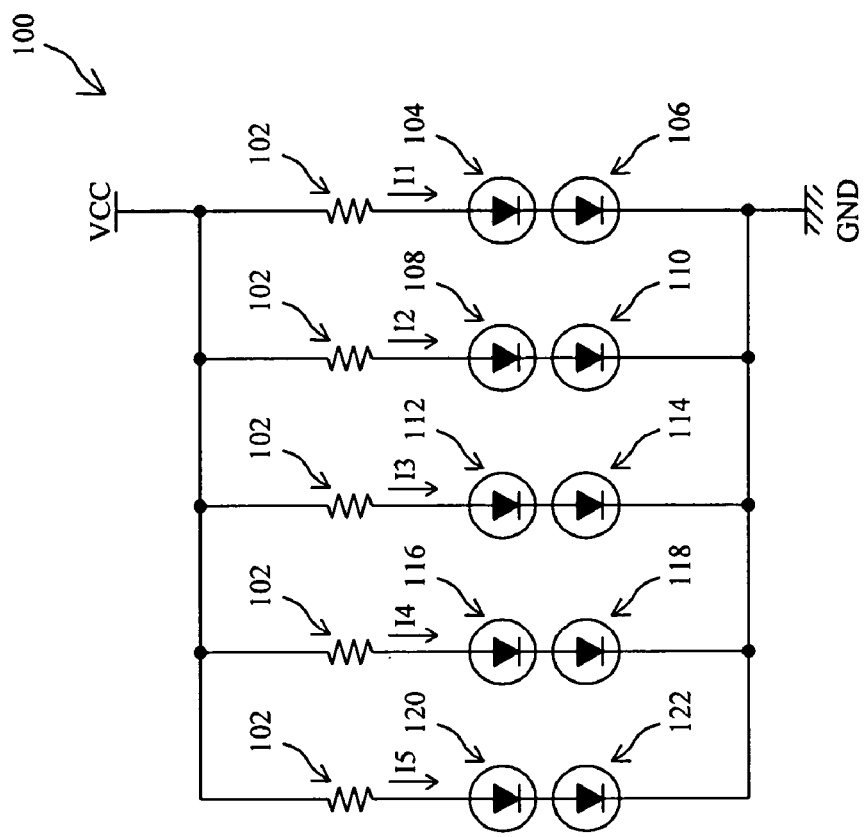
FIG. 1 shows a conventional LED driver.
Figure 3:
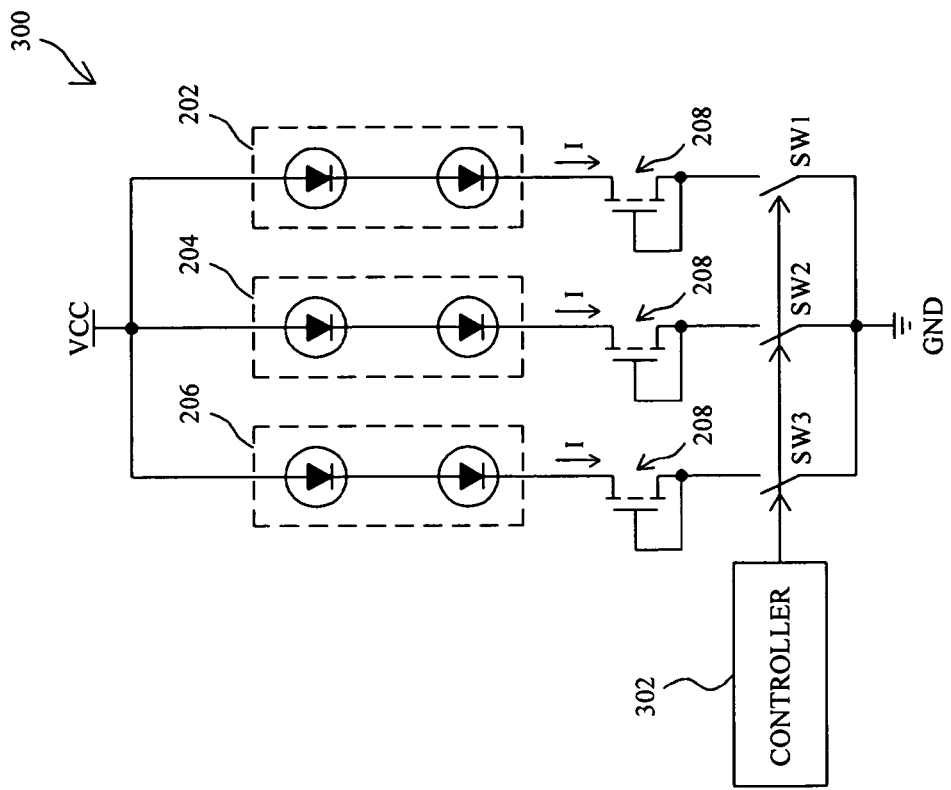
FIG. 3 shows a second embodiment of a LED driver according to the present invention.

FIG. 3 shows a LED driver 300 according to the present invention, which also comprises the light sources 202, 204, and 206, and the depletion mode NMOS transistors 208, as in the LED driver 200 of FIG. 2. However, to turn the light sources 202, 204, and 206 on and off, three switches SW1, SW2, and SW3 are inserted between a respective one of the depletion mode NMOS transistors 208 and ground GND, and a controller 302 is coupled to the switches SW1, SW2, and SW3 to switch them individually. The controller 302 may comprises a PWM or PFM controller for brightness modulation of the light sources 202, 204, and 206 by modulating the average of the driving current I.

Figure 4:
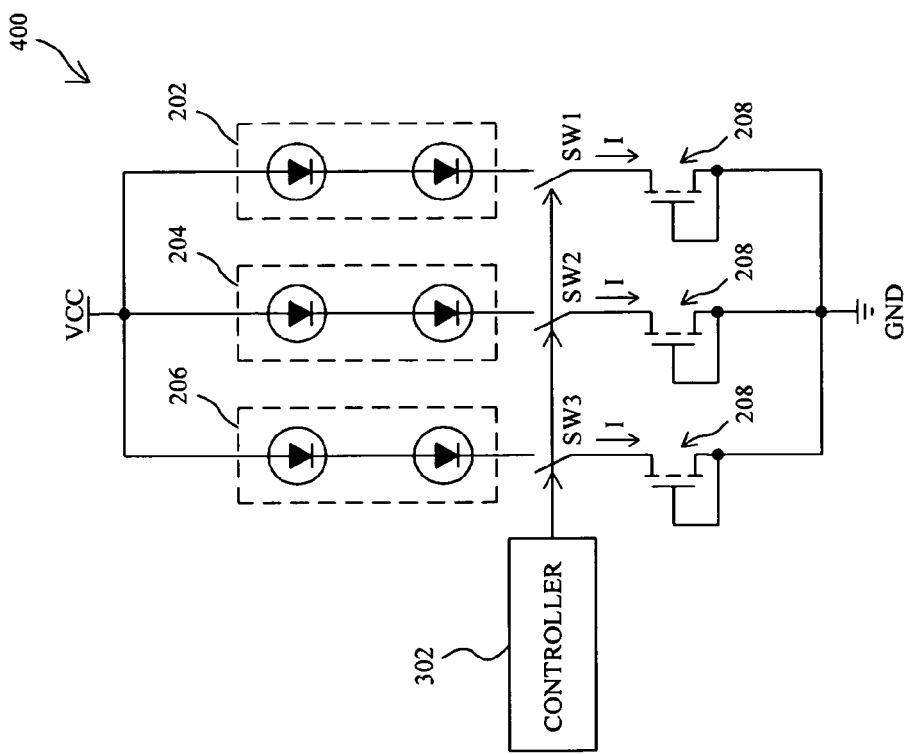
FIG. 4 shows a third embodiment of a LED driver according to the present invention.

As shown in FIG. 4, the LED driver 300 of FIG. 3 may be modified to be another one 400, in which the switches SW1, SW2, and SW3 are inserted between a respective one of the depletion mode NMOS transistors 208 and a respective one of the light sources 202-206.

Figure 5:
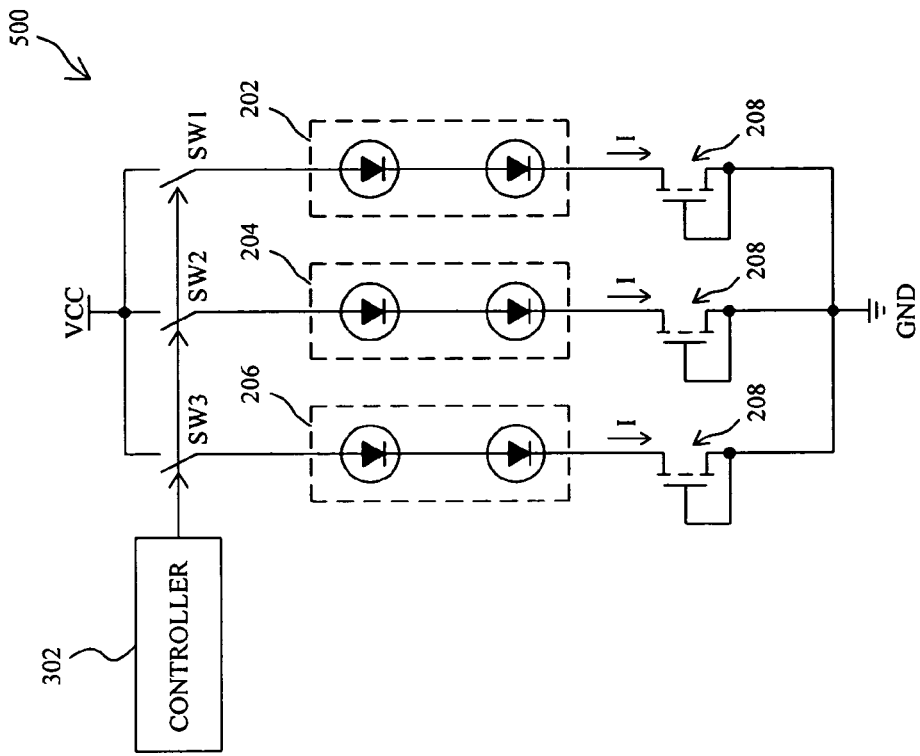
FIG. 5 shows a fourth embodiment of a LED driver according to the present invention.

Another modification of the LED driver 300 of FIG. 3 is shown in FIG. 5. In a LED driver 500, the switches SW1, SW2, and SW3 are inserted between a respective one of the light sources 202-206 and the supply voltage VCC.

Again, the depletion mode NMOS transistors 208 in the LED driver 300, 400, and 500 may be replaced with JFETs, such that the JFETs for serving the current sources may be integrated with the LEDs in the light sources 202-206 and the switches SW1-SW3 in a same chip.

Figure 6:
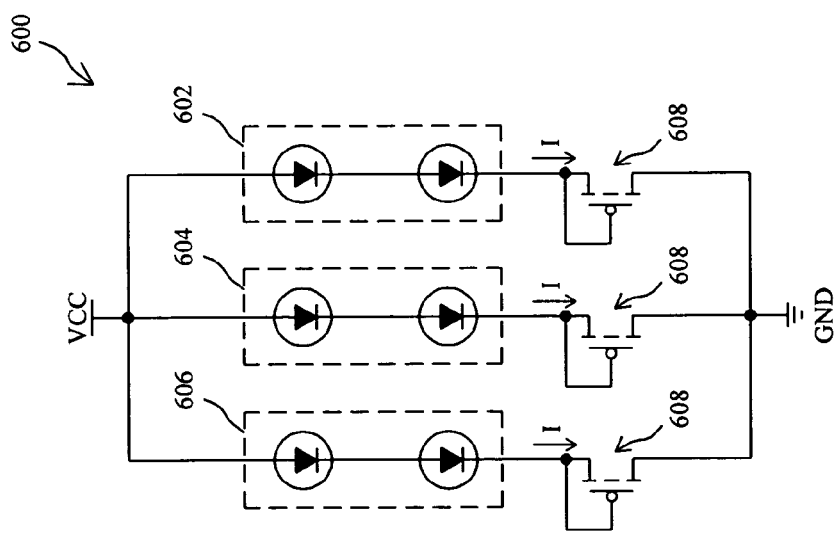
FIG. 6 shows a fifth embodiment of a LED driver according to the present invention.

In a LED driver 600 shown in FIG. 6, three light sources 602, 604, and 606 are coupled together in parallel between a supply voltage VCC and ground GND, and each of the light sources 602-606 includes two LEDs and is coupled in series with a depletion mode PMOS transistor 608 behaving as a current source and generating a driving current I by self-bias for a respective one of the light sources 602-606. For the self-bias, each of the depletion mode PMOS transistors 608 has its own gate and source coupled together to a respective one of the light sources 602-606, and its drain is grounded. In other embodiment, the depletion mode PMOS transistor 608 may be replaced with a JFET. For a JFET process could be combined in a LED process, the JFETs for serving as the current sources may be integrated with the LEDs in the light sources 602-606 on a same chip to further reduce the cost. Moreover, a JFET has a smaller conductive resistance, it may improve the efficiency of the LED driver 600.

Figure 7:
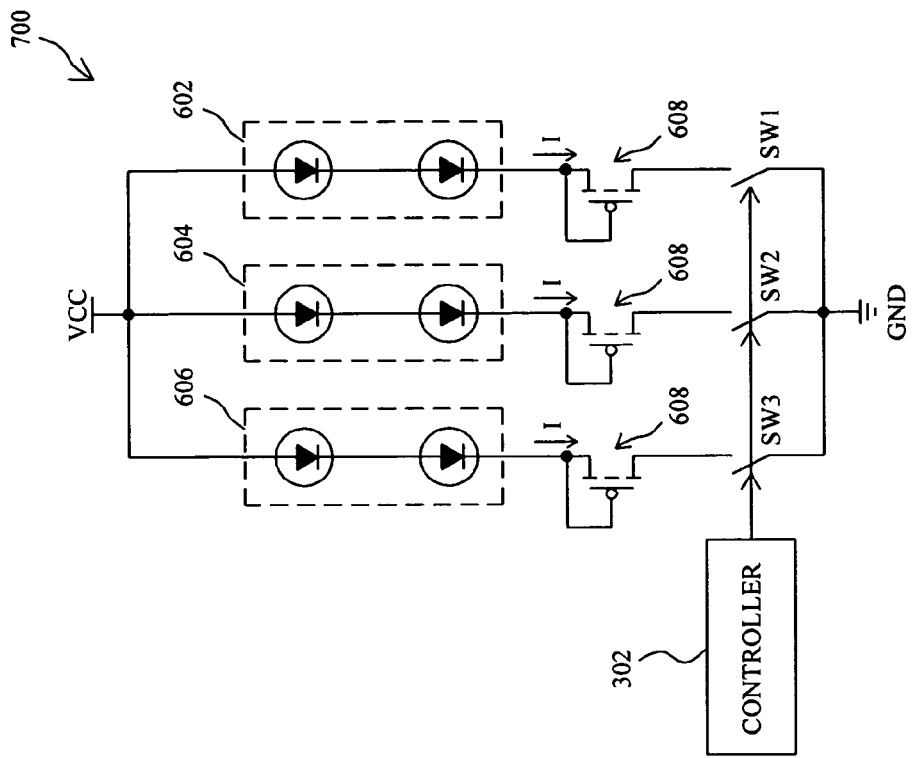
FIG. 7 shows a sixth embodiment of a LED driver according to the present invention.

As shown in FIG. 7, a LED driver 700 further comprises three switches SW1, SW2, and SW3 inserted between a respective one of the depletion mode PMOS transistors 608 and ground GND to turn the light sources 602-606 on and off, and a controller 302 coupled to the switches SW1, SW2, and SW3 to switch them individually. The controller 302 may comprises a PWM or PFM controller for brightness modulation of the light sources 602-606 by modulating the average of the driving current I.

Figure 8:
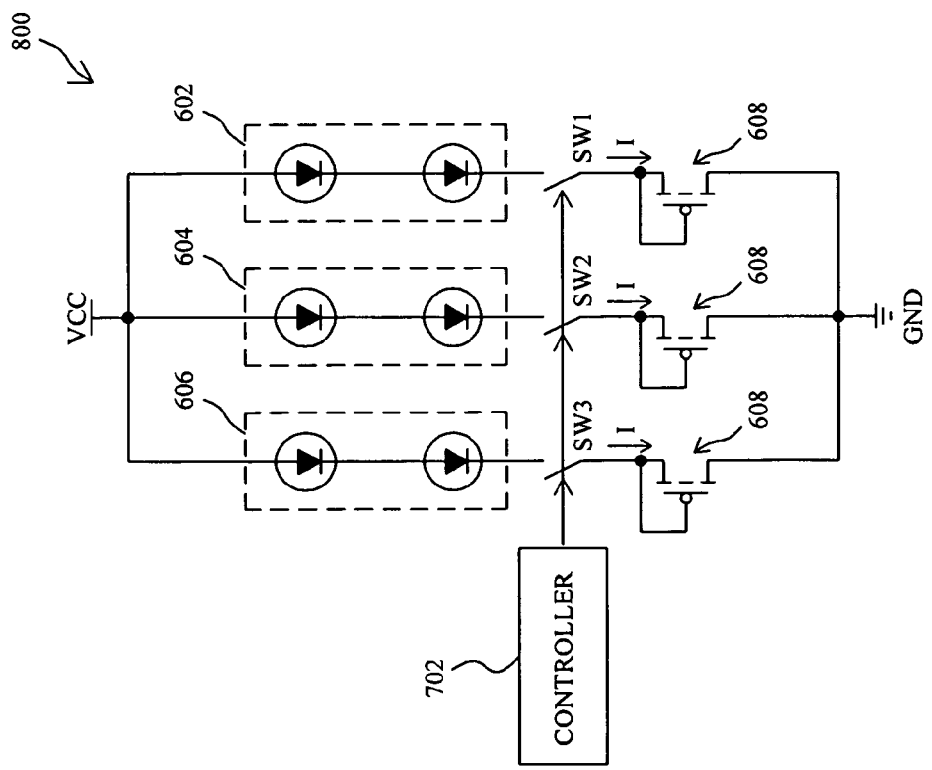
FIG. 8 shows a seventh embodiment of a LED driver according to the present invention.

In a modification 800 shown in FIG. 8, the switches SW1, SW2, and SW3 are inserted between a respective one of the depletion mode PMOS transistors 608 and a respective one of the light sources 602-606.

Figure 9:
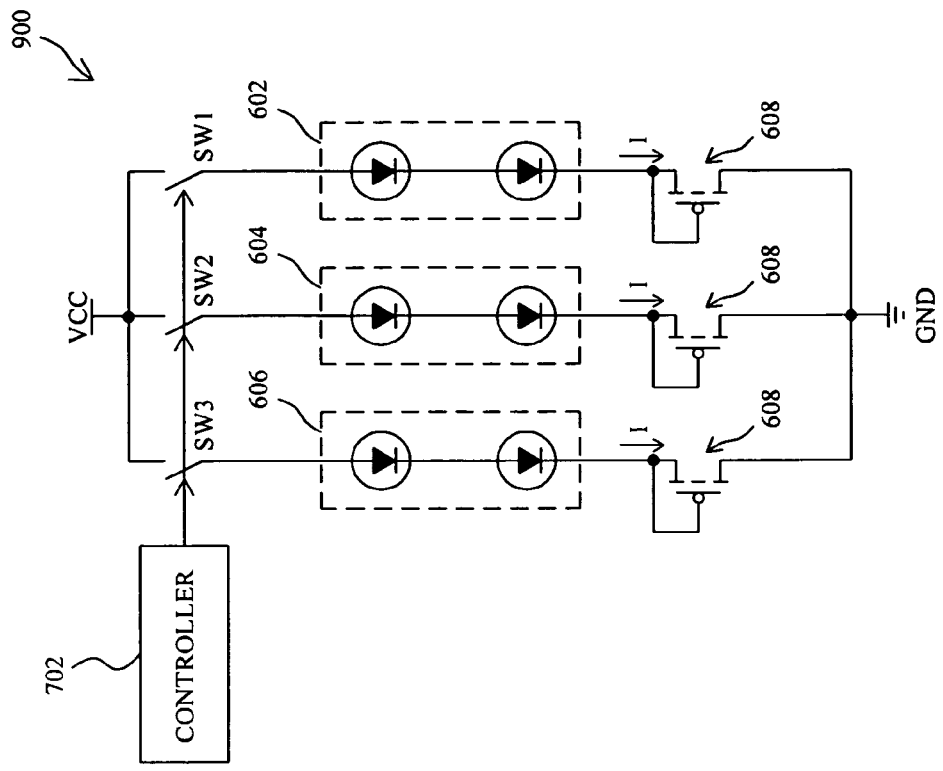
FIG. 9 shows an eighth embodiment of a LED driver according to the present invention.

Another modification 900 shown in FIG. 9 has the switches SW1, SW2, and SW3 inserted between a respective one of the light sources 602-606 and the supply voltage VCC.

Similarly, those depletion mode PMOS transistors 608 in the LED driver 700, 800, and 900 may be replaced with JFETs, such that the JFETs for serving the current sources may be integrated with the LEDs in the light sources 602-606 and the switches SW1-SW3 in a same chip.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A LED driver comprising:
   a plurality of parallel paths, on each of which is provided:
      at least one LED coupled with a supply voltage; and
      a current source including a depletion mode transistor having a gate, a source and a drain, wherein said gate and said source are connected to each other, thereby forming a self-biased transistor configuration wherein a voltage difference between said gate and said source is substantially equal to zero, the current source being a sole current source on the corresponding path, for controlling a driving current to drive the at least one LED,
   wherein at least two of said depletion mode transistors on said plurality of parallel paths have substantially the same threshold voltage, whereby the driving currents on at least two parallel paths corresponding to said at least two depletion mode transistors are substantially the same.

2. The LED driver of claim 1, further comprising a switch for switching the driving current on each of said plurality of parallel paths.

3. The LED driver of claim 1, wherein the depletion mode transistor is a MOSFET.

4. The LED driver of claim 3, wherein the MOSFET has a threshold voltage lower than −0.5V.

5. The LED driver of claim 1, wherein the depletion mode transistor is a JFET.

6. The LED driver of claim 5, wherein the at least one LED and current source are integrated in a chip.

7. The LED driver of claim 5, further comprising a switch for switching the driving current on each of said plurality of parallel paths.

8. The LED driver of claim 7, wherein the at least one LED, current source and switch are integrated in a chip.

9. The LED driver of claim 2, further comprising a controller for switching the switch.

10. The LED driver of claim 9, wherein the controller comprises a PWM or PFM controller.

* * * * *